United States Patent [19]

Humphreys

[11] Patent Number: 4,808,368
[45] Date of Patent: Feb. 28, 1989

[54] HIGH VOLTAGE SUPPLY FOR NEUTRON TUBES IN WELL LOGGING APPLICATIONS

[75] Inventor: D. Russell Humphreys, Albuquerque, N. Mex.

[73] Assignee: The United States of America as represented by the United States Department of Energy, Washington, D.C.

[21] Appl. No.: 418,150

[22] Filed: Sep. 15, 1982

[51] Int. Cl.⁴ ............................................. G01T 1/18
[52] U.S. Cl. ............................ 376/118; 250/262; 307/106; 315/176; 376/119
[58] Field of Search ............... 376/118, 119; 315/172, 315/173, 174, 175, 176; 363/61, 27; 250/262; 307/106, 107, 108

[56] References Cited

U.S. PATENT DOCUMENTS

| | | |
|---|---|---|
| 3,146,351 | 8/1964 | Hoyer et al. |
| 3,379,882 | 4/1968 | Youmans . |
| 3,379,884 | 4/1968 | Youmans . |
| 3,461,291 | 8/1969 | Goodman . |
| 3,714,468 | 1/1973 | Hopkinson . |
| 3,924,138 | 12/1975 | Hopkinson . |
| 4,409,647 | 10/1983 | Terkanian ............................ 363/27 |

OTHER PUBLICATIONS

Bivens et al., "Pulsed Neutron Uranium Borehole Logging with Prompt Fission Neutrons", IEEE Publication Number 76 CH 1175-9 NPS.
Rizk et al., "Feedback-Controlled Cascade Rectifier Source for HV Testing of Contaminated DC Insulators", IEEE, vol. PAS-100, No. 7, Jul. 1981.
Markus, Guidebook of Electronic Circuits, McGraw-Hill, Inc., 1974, p. 277.

Primary Examiner—Harvey E. Behrend
Assistant Examiner—Richard W. Wendtland
Attorney, Agent, or Firm—George H. Libman; James H. Chafin; Judson R. Hightower

[57] ABSTRACT

A high voltage supply is provided for a neutron tube used in well logging. The "biased pulse" supply of the invention combines DC and "full pulse" techniques and produces a target voltage comprising a substantial negative DC bias component on which is superimposed a pulse whose negative peak provides the desired negative voltage level for the neutron tube. The target voltage is preferably generated using voltage doubling techniques and employing a voltage source which generates bipolar pulse pairs having an amplitude corresponding to the DC bias level.

7 Claims, 3 Drawing Sheets

HIGH VOLTAGE SUPPLY FOR NEUTRON TUBES IN WELL LOGGING APPLICATIONS

TECHNICAL FIELD

The present invention relates to a high voltage supply particularly adapted for use with neutron tubes in well logging applications.

BACKGROUND ART

Neutron well logging is a well developed art and neutron well logging systems are described, for example, in U.S. Pat. Nos. 3,146,351 (Hoyer et al); 3,379,882 (Youmans); 3,379,884 (Youmans); 3,461,291 (Goodman); 3,714,468 (Hopkinson); and 3,924,138 (Hopkinson). Neutron tubes used in borehole logging probes require target voltages of on the order of one hundred thousand volts at average currents of about one milliampere. The tube and associated power supply assemblies must be of small diameter, typically two inches or less. Most applications require a burst of neutrons lasting about ten microseconds with repetition rates of from hundreds to thousands of pulses per second. The target voltage needs to be high only during the pulse, at which time the peak current is several hundred milliamperes.

Conventional power supplies for neutron tubes may be divided into two different types: D.C. and "full pulse". An example of the former type is disclosed in the Hopkinson patents referred to above. The latter type is disclosed, for example, in Bivens et al., Proceedings of the Fourth Conference on the Scientific and Industrial Applications of Small Accelerators (October 1976), pp. 441-446, "Pulsed Neutron Uranium Borehole Logging with Prompt Fission Neutrons", IEEE Publication No. 76 CH 1175-9 NPS.

DC supplies suffer several disadvantages. For example, they are large in size - with typical supplies being about three or four feet in length. Further, there are insulation limitations, with D.C. supplies requiring more insulation than pulsed voltage supplies. Because of this factor, the practical DC limit for a two-inch diameter assembly appears to be about 100 kV, whereas a deuterium-tritium neutron tube operates most efficiently at about 120 kV. In addition, neutron tubes are more prone to internal breakdown for DC voltages than for pulsed voltages. For example, the Zetatron manufactured by Sandia National Laboratories is limited to 80 kV DC but can be operated above 130 kV in the pulsed mode. On the other hand, the major advantage of a DC supply is that it will permit the associated neutron tube to operate at a higher repetition rate, since a DC supply is more efficient than a pulsed supply.

A full-pulse supply brings the target voltage from zero to full voltage and back to zero again in a few tens of microseconds, usually with the use of a single pulse transformer. This reduces the high voltage part of the supply to a length of less than six inches, thus allowing the tube and transformer to be "potted" together in a single convenient assembly or unit. Further, as mentioned above, a full-pulse supply does not stress the insulation and tube as much as a corresponding DC voltage. However, there are disadvantages with the full-pulse method. First, bringing the target from zero to full voltage during each pulse requires that the transformer dissipate more heat energy than with a DC supply, and this heat is concentrated in a smaller volume. The resulting temperature rise limits the repetition rate of the tube-transformer assembly to about 100 HZ and shortens the life of the assembly. Further, placing the 120-kV pulse transformer associated with the neutron tube into a two-inch diameter space results in a high insulation stress at various parts of the secondary winding and thereby limits the operating life of the transformer. In addition, after the main negative pulse is generated, the transformer voltage usually overshoots zero and applies a reverse (positive) voltage to the tube. This reverse voltage can reach tens of kilovolts and can cause breakdowns which shorten the life of the assembly.

SUMMARY OF THE INVENTION

In accordance with the invention a high voltage supply is provided which overcomes the disadvantages of the prior art techniques described above. Generally speaking, the high voltage supply of the invention, which for shorthand purposes will be referred to as a "biased-pulse" system, combines both DC and full-pulse techniques and involves the superimposition of a "moderate" pulse on a "moderate" (but substantial) DC bias to produce the voltage waveform. As will be set forth in more detail below, the biased-pulse system of the invention possesses the advantages of small size, high repetition rate, low voltage stress on the tube and associated transformer, low heating, no overshoot, and potentially longer life.

Briefly considering some important aspects of the invention, the target voltage produced is such that excursions of the pulse in a positive sense do not exceed the zero volt level (no positive overshoot) and, in exemplary embodiment, the bias and negative pulse peak voltages are roughly equal (about 60 kV so as to add to $-120$ kV). The negative DC bias voltage should be at least about $-50$ kV.

In a preferred embodiment, a bipolar pulse generator is used to generate the target voltage, in combination with a storage capacitor and shunt diode configuration.

Other features and advantages of the invention are set forth in, or will be apparent from, the detailed description of a preferred embodiment which follows.

DESCRIPTION OF THE PREFERRED EMBODIMENTS

Figure 1A:
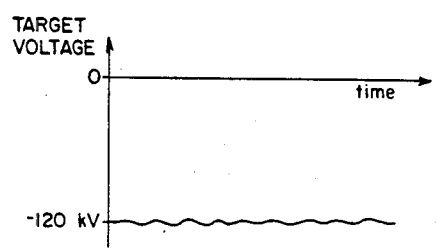
FIGS. 1(a) to 1(c) are typical target voltage waveforms associated with prior art systems and FIG. 1(d) is a typical target voltage waveform associated with the biased pulse high voltage supply of the invention.
Figure 1B:
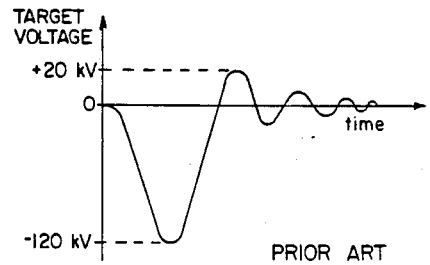
Figure 1C:
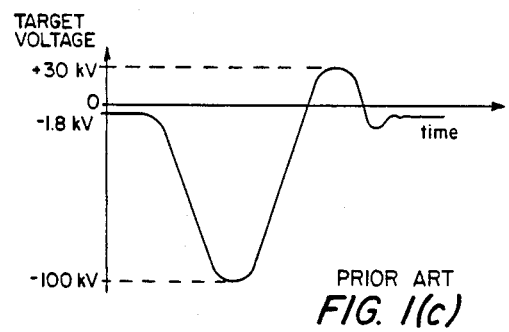

Referring to the drawings and, in particular, to FIGS. 1(a) to 1(d), the first of these figures, FIGS. 1(a) and 1(b), illustrate the voltage waveforms for conventional DC and full pulse systems such as discussed above and would appear to be self-explanatory. The voltage waveform shown in FIG. 1(c) is an approximation of the output waveform which would be produced by the circuit shown in FIG. 3 of the Hoyer et al. U.S. Pat. No. (3,146,351) mentioned above. The system is essentially a "full-pulse" system such as described above and as such would suffer the disadvantages discussed previously. As will become apparent, the only aspect of the waveform illustrated of any significance is that a small $-1.8$ kV bias is provided (produced by capacitor 41 and described at column 4, lines 34 and 35 of the patent). The purpose of this capacitor and the 1.8 kV bias is to augment the 1.2 kV power supply voltage in the primary circuit to produce a 3 kV effective charging voltage, which, when resonantly doubled, causes a 6 kV pulse to be applied to the transformer (see column 4, lines 2 to 8 and column 2, lines 63 to 67). It is noted that the Hoyer et al. patent is completely silent as to any importance attaching to the fact that the 1.8 kV voltage will also appear in the secondary circuit as a DC bias in the output and, indeed, the bias voltage is much too small to produce any of the advantages of the present invention mentioned above and discussed in more detail hereinbelow.

Figure 1D:
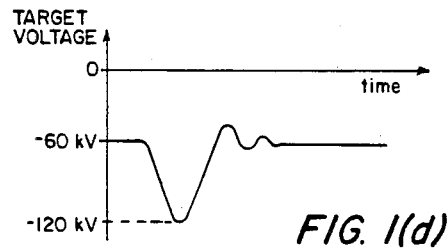

Referring now to FIG. 1(d), an exemplary version is shown of the output waveform produced in accordance with the invention. As indicated above, the invention involves combining DC and full pulse techniques and as illustrated, a substantial negative DC bias ($-60$ kV) is provided on which is superimposed a pulse having a negative peak at approximately $-120$ kV. Although these values are, of course, merely illustrative, it appears that the bias voltage provided should be at least about 50 kV in order to produce the advantages mentioned above and discussed hereinafter.

Figure 2:
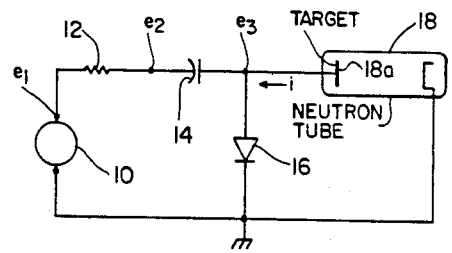
FIG. 2 is a circuit diagram of a preferred embodiment of the high voltage supply of the invention.

Referring to FIG. 2, a preferred embodiment of the biased pulse system of the invention is shown. It will be understood that there are other ways in which the waveform shown in FIG. 1(d) can be implemented; however, the circuit illustrated has advantages with respect to simplification of the high-voltage end of the assembly.

The circuit illustrated in FIG. 2 is basically a cascade voltage doubler of the general type discussed, for example, in Reference Data for Radio Engineers, 5th Edition, p 13-3, H. P. Westerman, Editor, Howard W. Sams and Co. (1970), New York, but without the final diode and capacitor described in the reference. The circuit of FIG. 2 includes a voltage source 10 connected in series with a resistor 12, which represents the source resistance, and capacitor 14. A diode 15 is connected in shunt and a neutron tube 18 is connected between the junction between capacitor 14 and diode 16, and ground.

Figure 3A:
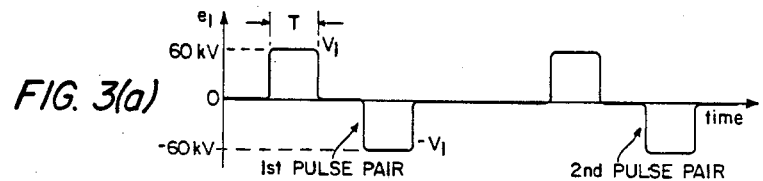
FIGS. 3(a) to 3(c) and FIGS. 4(a) and 4(b) are waveforms associated with the operation of the circuit of FIG. 2, with, and without, the neutron tube connected to the circuit, respectively.
Figure 3B:
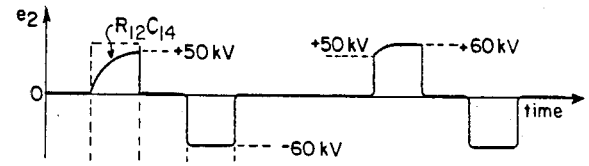
Figure 3C:
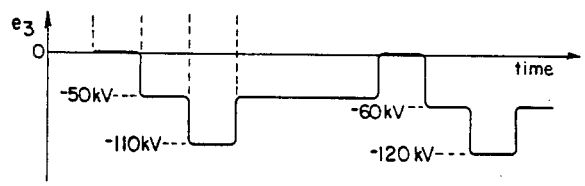

In operation, voltage source 10 generates a waveform $e_1$ comprising bipolar pairs of pulses which are illustrated in FIG. 3(a) and which have an amplitude $V_1$. In the exemplary embodiment under consideration, $V_1$ is taken to be 60 kV. The first positive pulse produces charging of capacitor 14 through resistor 12 and diode 16. If the plse width T (see FIG. 3(a)) is about the same as the charging time constant $R_{12}C_{14}$, the capacitor 14 will not charge up fully to 60 kV, but will charge to a lesser voltage, for example, 50 kV, as illustrated in FIG. 3(b). When the source voltage $e_1$ drops to zero, the diode 16 ceases conduction and the voltage stored by capacitor 14 appears at the target 18a of neutron tube 18, thereby causing the target input voltage $e_3$ (shown in FIG. 3(c)) to drop from zero to $-50$ kV. In this initial analysis, it will be assumed that tube 18 does not conduct and thus $e_3$ will be held at $-50$ kV for a long period, since leakage currents are relatively low.

When the second positive pulse is generated by source 10, charging of capacitor 14 is completed so that the DC bias voltage at the tube target 18a becomes $-60$ kV in the specific example being considered. When the second negative pulse arrives, the target voltage $e_3$ goes to the full negative voltage $-120$ kV. Thus, the circuit provides for building up to the full voltage within two or three pulses.

Figure 4A:
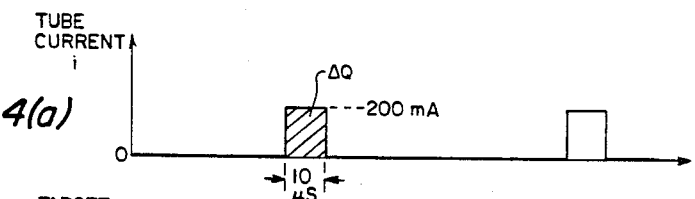
Figure 4B:
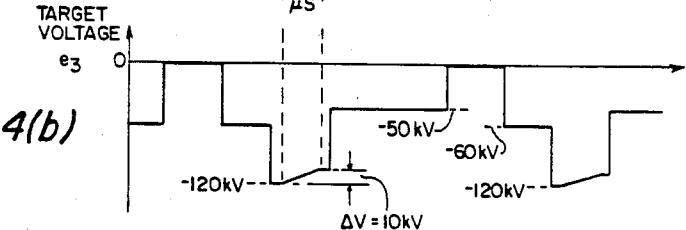

Referring to FIGS. 4(a) and 4(b) and considering now the operation when neutron tube 18 conducts current (denoted i in FIG. 2 and FIG. 4(a)) during the time of the peak negative voltage, if the tube draws a charge $\Delta Q$ during such a pulse, the reduction in the voltage on capacitor 14 will reduce the target voltage $e_3$ by an amount $\Delta Q/C$. If the tube current is 200 mA for 10 microseconds the change in charge $\Delta Q$ is 2 microcoulombs. Thus, if the value of capacitor 14 is 200 pf, the voltage drop $\Delta V$ is 10 kV. The DC bias voltage will then continue at a lower level than the unloaded level until the next positive pulse. The new positive pulse will then restore the 2 microcoulomb charge and return the bias to $-60$ kV in time for the next positive pulse.

Figure 5:
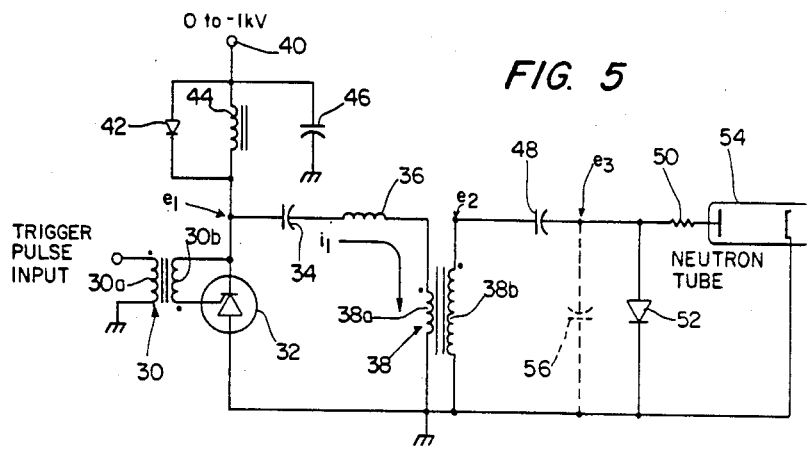
FIG. 5 is a circuit diagram of an actual circuit used in testing the invention.

Referring to FIG. 5, the basic components of a circuit are shown which was used to test the invention on an actual neutron tube. The circuit includes an isolation transformer 30 whose primary 30a receives a trigger pulse input and whose secondary 30b is connected to the gate of a SCR 32. SCR 32 is connected, through a capacitor 34 and a small current limiting inductor 36, to the primary winding 38a of a high voltage transformer 38. A power supply terminal 40 of a 0 to $-1$ kV power supply is connected through the parallel combination of a diode 42 and a current limiting inductor 44 to the junction between transforaer secondary 30b and capacitor 34. A capacitor 46 is connected in shunt to ground.

The secondary winding 38b of transformer 38 is connected through a high voltage capacitor 48 and a resistor 50, and a high voltage shunt diode string 52, to a neutron tube 54.

In general, the circuit of FIG. 5 uses a resonant effect in the secondary circuit of high voltage transformer 38 to provide the bipolar pulse needed to drive high voltage capacitor 48 and diode 52.

Figure 6A:
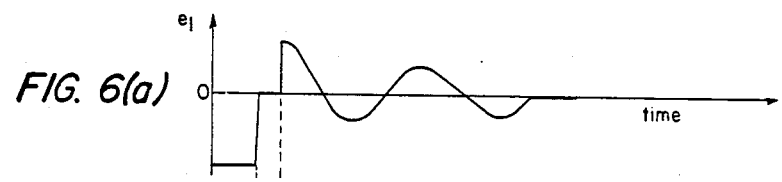
FIGS. 6(a) and 6(d) are waveforms associated with the operation of the circuit of FIG. 5.
Figure 6B:
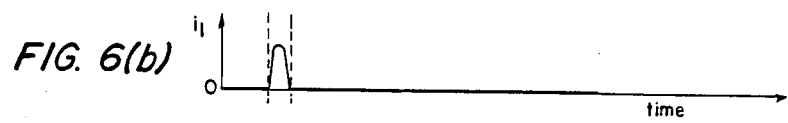
Figure 6C:
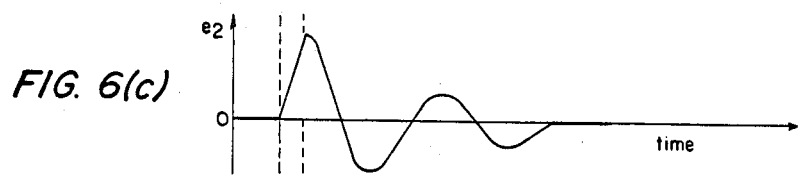

Considering this operation in more detail, when the negative power supply is turned on, capacitor 34 charges through inductor 44 to the full supply voltage, which is, for example, $-1$ kV in the specific embodiment being considered. Diode 42 prevents the capacitor voltage from going higher than the supply voltage. A trigger pulse provided through isolation transformer 30 then fires SCR 32, thereby discharging capacitor 34 though inductor 36 into the primary winding 38a of transformer 38. The voltage $e_1$ and the primary current $i_1$ are illustrated in FIGS. 6(a) and 6(b), respectively. Discharging of capacitor 34 produces a positive voltage, denoted $e_2$, in transformer secondary 38b as illustrated in FIG. 6(c). This voltage charges up capacitor 48 through diode string 52. If capacitor 48 is fully charged (and this will occur after several pulses), a pulse current flows through the stray capacitance indicated at 56.

When the capacitor 34 is fully discharged, SCR 32 is cut off and thus opens the primary circuit of transformer 38. Under these conditions, the inductance of the secondary circuit increases to the open circuit value, denoted L, and the combined capacitance, C, of capacitances 48 and 56, begins to discharge through the secondary winding 38b to ground. This causes voltages $e_2$ and $e_3$ to decrease sinusoidally with a frequency $f=1/(2\pi LC)$ where C is the combined capacitance of capacitances 48 and 56. Because the capacitance of capacitor 48 is very much greater than that of stray capacitance 56 and $C=(C_{48}C_{56})/(C_{48}+C_{56})$, C is substantially equal to the stray capacitance 56.

Figure 6D:
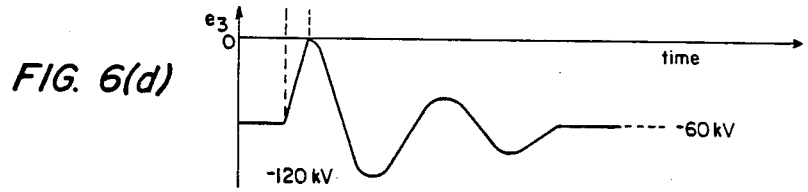

It is noted that the transformer voltage $e_2$ swings down through zero to a large negative value (See FIG. 6(c)) because the LC circuit is not heavily loaded. The target voltage, $e_3$, goes to the peak negative voltage thereof at the same time (see FIG. 6(d)). If the neutron tube 54 is turned on at this point, the loading provided thereby will dampen the oscillations somewhat and the voltage $e_3$ will settle to 20 percent of its DC value in about one cycle.

Turning back to an earlier time in a cycle, when the SCR 32 stops conducting, the voltage $e_1$ thereacross jumps to a large positive valve (see FIG. 6(a)). This is the result of the fact that transforaer 38 was previously reflecting the rising voltage in the secondary winding 38b back into primary winding 38a, but the primary circuit is open with SCR 32 turned off. After the jump in voltage referred to, the waveform $e_1$ follows the secondary voltage $e_2$, and drops down through zero in about a quarter of a cycle. The positive swing voltage $e_1$, being in the opposite direction, provides time for SCR 32 to recover and aids in this recovery. However, the time for recovery is very short (i.e., only a few tens of microseconds) and thus SCR 32 must be of the fast turnoff type. In addition, SCR 32 must be able to withstand high voltages and currents.

As mentioned above, the open-circuit secondary winding inductance, L, and the stray capacitance (indicated at 56) are the major factors which determine both the pulse width and the SCR turnoff time. The width, T, of the high-voltage pulse at the 60 kV level is approximately $\pi\sqrt{LC_{56}}$. For typical values of inductance (10 henries) and stray capacitance (20 pf), T is 44 microseconds. The turnoff time is approximately T/2 or 22 microseconds. The function of resistor 50 is to limit tube current in the event of an internal breakdown. Typically, resistor 50 has a value of about ten thousand ohms, high enough to limit transients but low enough not to hinder the normal operation of the tube 54. Other exemplary values include 1.6h for inductor 44, 1 uf for capacitor 34, 10uh for inductor 36, and 125 pf for capacitor 48. Diode string 52 is formed by twelve 15 kV diodes in series and tube 54 is a "Zetatron" made by Sandia National Laboratories. Transformer 38 is a 1:60 or 1:120 step-up transformer with L=3h and 15h, respectively.

Reviewing in more detail the advantages of the invention in view for the foregoing discussion, it will be seen that the invention provides lower transformer voltages and lower power loss. In the former regard, the transformer secondary reaches only 60 kV with respect to ground rather than 120 kV as in the full pulse method, thereby reducing electric field levels near the transformer, (one of the more stressed areas of the assembly). With regard to the latter advantage, tests show that the invention requires less than 50 percent of the energy per pulse to achieve the same voltages as the full pulse technique. This results in lower heating of the tube/transformer assembly. Further, the lower heat dissipation per pulse permits a higher pulse repetition rate than the full pulse technique. The secondary shunt diode completely eliminates any possibility of positive voltage swings such as produced with the full pulse method, thereby protecting the tube/transformer against reverse breakdowns. In addition, the "biased pulse" system of the invention applies only a 60 kV DC voltage to the neutron tube, thereby stressing the tube and the surrounding insulation less than a pure DC system. Further, the "biased pulse" tube/transformer can be made to be not much longer than the full pulse assembly and thus much shorter than a pure DC supply. In this regard, a probe can be formed by the serial connection of a pulse transformer including a slot for the transformer core, a capacitor (corresponding to capacitor 48), a resistor (corresponding to resistor 50) and the neutron tube all encased with potting material having a grounded exterior coating, and with the diode string (corresponding to diode string 52) spiralled around the capacitor and connected to the exterior grounded coating. This reduction in size allows the detector to be disposed closer to the neutron tube, a significant advantage in well logging probes. Finally, the lower voltages and heat stresses produced with the biased pulse system of the invention presents the possibility of a substantially longer operating life for neutron tube power supplies.

Although the invention has been described relative to preferred embodiments thereof, it will be understood that variations and modifications can be effected in these exemplary embodiments without departing from the scope and spirit of the invention.

I claim:

1. A neutron well logging system for generating short bursts of neutrons including:
   a probe containing a neutron tube having a target electrode, said tube generating neutrons when a negative voltage exceeding a desired target voltage is applied to said electrode;
   high voltage supply means for generating a composite voltage, said voltage comprising a pulse train having a fixed period between adjacent pulses superimposed on a substantial negative DC bias voltage, the negative peak of the voltage exceeding the desired target voltage for a substantially shorter time than the fixed period and the most positive portion of the voltage being less than zero volts; and
   means for connecting the output of said supply means to said target electrode.

2. A neutron well logging system as claimed in claim 1 wherein said negative bias voltage is at least about $-50$ kV DC.

3. A neutron well logging system as claimed in claim 1 wherein said generating means comprises pulse generating means for generating pairs of bipolar pulses.

4. A neutron well logging system as claimed in claim 3 wherein a storage capacitor is connected in series with said pulse generating means and diode means is connected in shunt with said capacitor.

5. A neutron well logging system as claimed in claim 1 wherein said generating means includes diode means for limiting positive excursions of said pulse.

6. A neutron well logging system as claimed in claim 4 wherein said bias voltage is approximately $-60$ kV and the negative peak lies at approximately $-120$ kV.

7. A neutron well logging system as claimed in claim 3 wherein said pulse generating means includes a serial combination of a high voltage pulse transformer, a capacitor and a resistor connected to the target electrode of the neutron tube and a string of diodes connected between ground and a point on the junction between said capacitor and said resistor.

* * * * *